US008397076B2

(12) United States Patent
Brown et al.

(10) Patent No.: US 8,397,076 B2
(45) Date of Patent: Mar. 12, 2013

(54) SYSTEM AND METHOD FOR REMOTE RESET OF PASSWORD AND ENCRYPTION KEY

(75) Inventors: Michael K. Brown, Fergus (CA);
Michael S. Brown, Kitchener (CA);
Herbert A. Little, Waterloo (CA)

(73) Assignee: Research In Motion Limited, Waterloo (CA)

( * ) Notice: Subject to any disclaimer, the term of this patent is extended or adjusted under 35 U.S.C. 154(b) by 0 days.

(21) Appl. No.: 13/274,031

(22) Filed: Oct. 14, 2011

(65) Prior Publication Data

US 2012/0066505 A1 Mar. 15, 2012

Related U.S. Application Data

(63) Continuation of application No. 11/383,369, filed on May 15, 2006, now Pat. No. 8,074,078.

(51) Int. Cl.
*H04K 1/00* (2006.01)
(52) U.S. Cl. ............... 713/183; 713/189; 380/30; 726/5
(58) Field of Classification Search .................. 713/183, 713/189, 193; 380/30, 277, 278, 279, 284, 380/285; 705/51; 726/5
See application file for complete search history.

(56) References Cited

U.S. PATENT DOCUMENTS

| | | | |
|---|---|---|---|
| 5,768,373 A | 6/1998 | Lohstroh et al. | |
| 6,754,349 B1 | 6/2004 | Arthan | |
| 2003/0182584 A1 | 9/2003 | Banes et al. | |
| 2003/0185398 A1* | 10/2003 | Hypponnen | 380/277 |
| 2003/0188201 A1* | 10/2003 | Venkataramappa | 713/202 |
| 2004/0139320 A1* | 7/2004 | Shinohara | 713/168 |
| 2004/0184616 A1* | 9/2004 | Morten | 380/285 |

FOREIGN PATENT DOCUMENTS

| | | |
|---|---|---|
| EP | 1079565 A | 2/2001 |
| EP | 1079565 A2 * | 2/2001 |
| WO | 2004077782 A | 9/2004 |

OTHER PUBLICATIONS

Extended European Search Report dated Sep. 27, 2006 from EP06113904.4.
Examiner's Report dated May 16, 2008 from EP06113904.4.
Examiner's Report dated Apr. 27, 2009 from EP06113904.4.
Examiner's Report dated Apr. 7, 2010 from CA2588309.
Extended European Search Report dated Dec. 27, 2010 from EP10185150.9.
Examiner's Report dated Jan. 11, 2011 from CA2588309.
Extended European Search Report dated Feb. 2, 2011 from EP10185157.4.

* cited by examiner

*Primary Examiner* — Kim Vu
*Assistant Examiner* — Baotran N To
(74) *Attorney, Agent, or Firm* — Dimock Stratton LLP; Jenna L. Wilson

(57) ABSTRACT

A method and system are provided for resetting a password using a first device and a second device. The second device stores data encrypted using a content protection key, which itself is stored in encrypted form using the password, and is also stored in encrypted form using a key encryption key. The first device receives a public key from a second device. The first device uses the public key and a stored private key to generate a further public key. The further public key and a new password are sent to the second device. The second device uses the further public key to generate the key encryption key, which is then used to decrypt the encrypted content protection key. A new content encryption key is created, and encrypted using the new password.

14 Claims, 4 Drawing Sheets

SYSTEM AND METHOD FOR REMOTE RESET OF PASSWORD AND ENCRYPTION KEY

REFERENCE TO PRIOR APPLICATIONS

This application is a continuation of U.S. patent application Ser. No. 11/383,369, filed May 15, 2006, which is incorporated herein by reference.

BACKGROUND

1. Technical Field

The present invention relates generally to the field of computer and network security, and in particular to password administration.

2. Description of the Related Art

Data stored in the memory of a communication and/or computing device, such as a mobile communication device, may be secured by encrypting using a content protection key. This key, in turn, is preferably protected by, or derived in part from, a user-entered password, PIN, or other piece of user-supplied data. This is one means to ensure that sensitive data stored on the communication device is accessible only by a designated user.

Because user-entered passwords are often dependent on the user mentally recalling the password, it is sometimes necessary for the user, an administrator or other person to reset the user's password to another value when the user forgets the existing password. The resetting procedure may be invoked remotely from another device in communication with the user's device, for example from a server located on the same network as the user's device. However, when content protection is enabled and data on the communication device is encrypted using a content protection key protected by or derived from the existing user password, the content protection key cannot be recovered without the existing user password. If the user cannot recall the existing password, the protected data is rendered inaccessible.

It is therefore desirable to provide a system and method for resetting a password that is used to protect or derive a content protection key on a device from a remote location, while continuing to provide access to device content that is encrypted using the content protection key.

BRIEF DESCRIPTION OF THE DRAWINGS

In drawings which illustrate by way of example only a preferred embodiment of the invention.

DETAILED DESCRIPTION OF THE INVENTION

Figure 1:
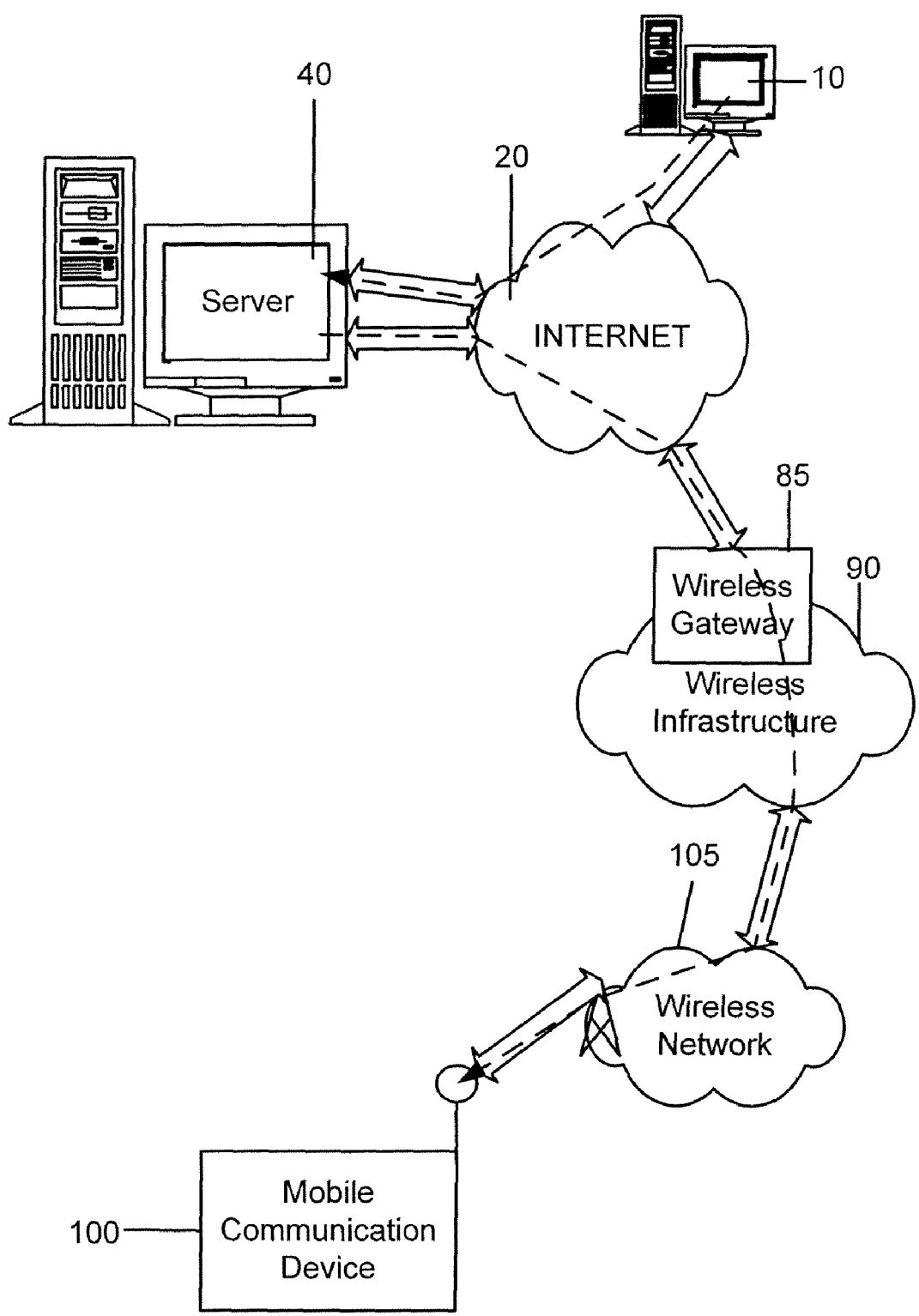
FIG. 1 is a schematic of a network for carrying out a method for remotely setting and resetting a password and an encryption key.

Referring to FIG. 1, an overview of an exemplary communication system for use with the embodiments described below is shown. One skilled in the art will appreciate that there may be many different topologies, but the system shown in FIG. 1 helps demonstrate the operation of the systems and methods described in the present application. There may be many communications devices connected to the system, that are not shown in the simple overview of FIG. 1.

FIG. 1 shows first communication device, here a personal computer 10, a network, here the Internet 20, a server system 40, a wireless gateway 85, wireless infrastructure 90, a wireless network 105 and a second communication device, here a mobile communication device 100. It will be appreciated by those skilled in the art that the devices referred to herein as communication devices or data storage devices may comprise devices whose main function is directed to data or voice communication over a network and data storage, but may also be provided with personal or productivity applications, or devices whose main function is directed to computing or executing productivity applications, but are also adapted to enable a user to communicate over a network.

A personal computer 10 may, for example, be connected to an ISP (Internet Service Provider) on which a user of the system has an account, located within a company, possibly connected to a local area network (LAN), and connected to the Internet 20, or connected to the Internet 20 through a large ASP (application service provider). Those skilled in the art will appreciate that the systems shown in FIG. 1 may instead be connected to a wide area network (WAN) other than the Internet.

The wireless gateway 85 and infrastructure 90 provide a link between the Internet 20 and wireless network 105. The wireless infrastructure 90 determines the most likely network for locating a given user and tracks the user as they roam between countries or networks. Messages and other data may be delivered to the mobile device 100 via wireless transmission, typically at a radio frequency (RF), from a base station in the wireless network 105 to the mobile device 100. The particular network 105 may be any wireless network over which messages may be exchanged with a mobile communication device. The mobile device 100 may also receive data by other means, for example through a direct connection to a port provided on the mobile device 100, such as a Universal Serial Bus (USB) link.

The server 40 may be implemented, for example, on a network computer within the firewall of a corporation, a computer within an ISP or ASP system or the like. The server 40 may act as the application, network access, and/or file server for one or more communication devices. The mobile device 100, if it is configured for receiving and possibly sending e-mail, will normally be associated with an account on the server 40. The software products and other components that are often used in conjunction with the functions of the server 40 described herein are not shown in FIG. 1, as they do not directly play a role in the system and method described below. If the server 40 acts as a message server, the server 40 may support either a so-called "pull" or "push" message access scheme, wherein the mobile device 100 must request that stored messages be forwarded by the message server to the mobile device 100, or the server 40 may be provided with means for automatically redirecting messages addressed to the user of the mobile device 100 as they are received, respectively.

As can be seen from the following description, the server 40 may be used to provide administrative functions for the communication devices 10 and 100, for example by establishing and transmitting information technology (IT) policies. In the preferred embodiment, administrator access is provided at the server 40 for resetting device passwords, although the system and method described herein may be implemented from another device on the network, if such administrator-level access is provided at the other device.

Data stored in a memory in the mobile device 100 or the other communication device 10, such as user- or administrator-provided content or encryption keys, may be secured in part by means of a user-entered password, PIN, or similar access control method. Content may include electronic messages, personal information, or other data caused to be entered or created by the user of the device 100 or 10. Suitable access control methods may include increasing security by providing a smart card reader for accessing security data from a smart card in the user's possession upon a request issued by the mobile device 100 or other communication device 10. Such security mechanisms prevent an unauthorized user from obtaining access to the data via the user interface provided by the device.

Preferably, a user-entered password is not the sole means by which content on the device 100 or 10 is secured. Rather, the password, using methods known in the art, is used alone or in conjunction with other encryption data to secure another key, such as a content protection key or a content protection bulk key K, that is used in turn to encrypt data. The content protection key K itself may be an Advanced Encryption Standard (AES) cryptographic key with a 128, 192, or 256 bit length, or another key for use with encryption software in accordance with another standard. As those skilled in the art will appreciate, other encryption standards may be used to define the nature of the content protection key K, although preferably a symmetric block cipher method is used. Further, the content protection key K may not be used directly to convert data into ciphertext; instead, the device 100 or 10 may be configured to use the content protection key K to generate one or more further content encryption keys for encrypting and/or decrypting data stored on the device 100 or 10. However, preferably neither the content protection key K nor any further keys derived from the key K are stored in the clear in the memory of the communication device 100 or 10.

For example, the password may be used to encrypt the content protection key K, and the encrypted content protection key K may be stored in the non-volatile memory of the device 100 or 10. The non-volatile memory is discussed below with reference to FIG. 4. When the device 100 or 10 is first accessed by the user, the user is prompted to enter a password. The entered password may be compared with a password stored in the memory of the communication device 100 or 10. Preferably, however, the password itself is not stored in the clear on the device; rather, a hash (or some other function) of the password entered by the user is compared to a hash (or some other function) of the password stored in memory. If the compared data matches, then the user is authenticated and the entered password may be stored in volatile memory, also described below with reference to FIG. 4, on the device 100 or 10. The password may be stored in volatile memory for the duration of a user session, which may be terminated by "logging off" the device, suspending operations of the device 100 or 10 by placing the device in a standby mode, powering off the device 100 or 10 or otherwise disconnecting a power supply from the volatile memory, or in accordance with other IT policies, for example by erasing the password from volatile memory after a set period of time or immediately after user authentication.

If it is desirable to protect data stored in the memory of the device 100 or 10 using the content protection key K, when the device 100 or 10 determines that an encryption key is required for converting the data to be protected to ciphertext, it accesses the encrypted content protection key K and decrypts the key using the password stored in volatile memory. The decrypted content protection key K is stored in volatile memory and is used to either encrypt the data to be protected and stored, or to generate further encryption keys for encrypting the data to be protected and stored. However the content protection key K is used, it may be deleted from volatile memory after the data is encrypted. In that case, when the device 100 or 10 requires data that was previously encrypted, the device 100 or 10 again accesses the encrypted content protection key K, decrypts it and stores it in volatile memory, then either decrypts the required data by using the key K directly or by deriving the necessary further keys to decrypt the data. After the key K has been used, it is again deleted from volatile memory. The content protection key K is thus only stored in the clear in volatile memory on a transitory basis. Alternatively, once the content protection key K has been decrypted a first time during a user session, it may be retained in volatile memory until the user session is terminated.

The communication device 100 or 10 may be connected to a network such as that described in FIG. 1, and may be provided with IT policies relating to content protection. Preferably, some security policies and features on the device 100 or 10 may be controlled from a remote location on the network, for example from the server 40. This is particularly useful in the event that a user forgets his or her password for accessing the device 100 or 10, as an administrator or other person with sufficient privileges may force a password reset on the device 100 or 10 over the network.

However, if the password is used to encrypt the content protection key K, then when a password is reset the content protection key K ceases to be available to the device 100 or 10. Therefore, in accordance with the preferred embodiment, the content protection key K is re-established by the device 100 or 10 using information provided by the server 40 as follows, with reference to FIG. 2.

When a content protection key K is established for a data storage device such as the communications device 100 or 10, the resetting device, such as the server 40, first selects or generates a private key b at step 205. The private key b is preferably generated as a random or pseudo-random number and is appropriate for use in an elliptic curve cryptography algorithm, for example in accordance with an encryption algorithm approved by the National Institute of Standards and Technology (NIST). However, any alternate asymmetric key cryptography algorithm may be employed. Preferably, an elliptic curve cryptography algorithm is used, and most preferably at least a 521-bit key is used and the elliptic curve used has a cofactor of 1. Using b and a pre-determined elliptic point P, the server 40 calculates $B=bP$ at step 210 and stores b securely at step 215. b may be encrypted itself using means known in the art, and stored as ciphertext. At step 220, the result B is transmitted to the communications device 100 or 10. At this point, the server 40 and the device 100 or 10 may agree to a selected encryption algorithm, or alternatively an encryption algorithm may have been previously set by the IT policies between the server 40 to the device 100 or 10.

Figure 2:
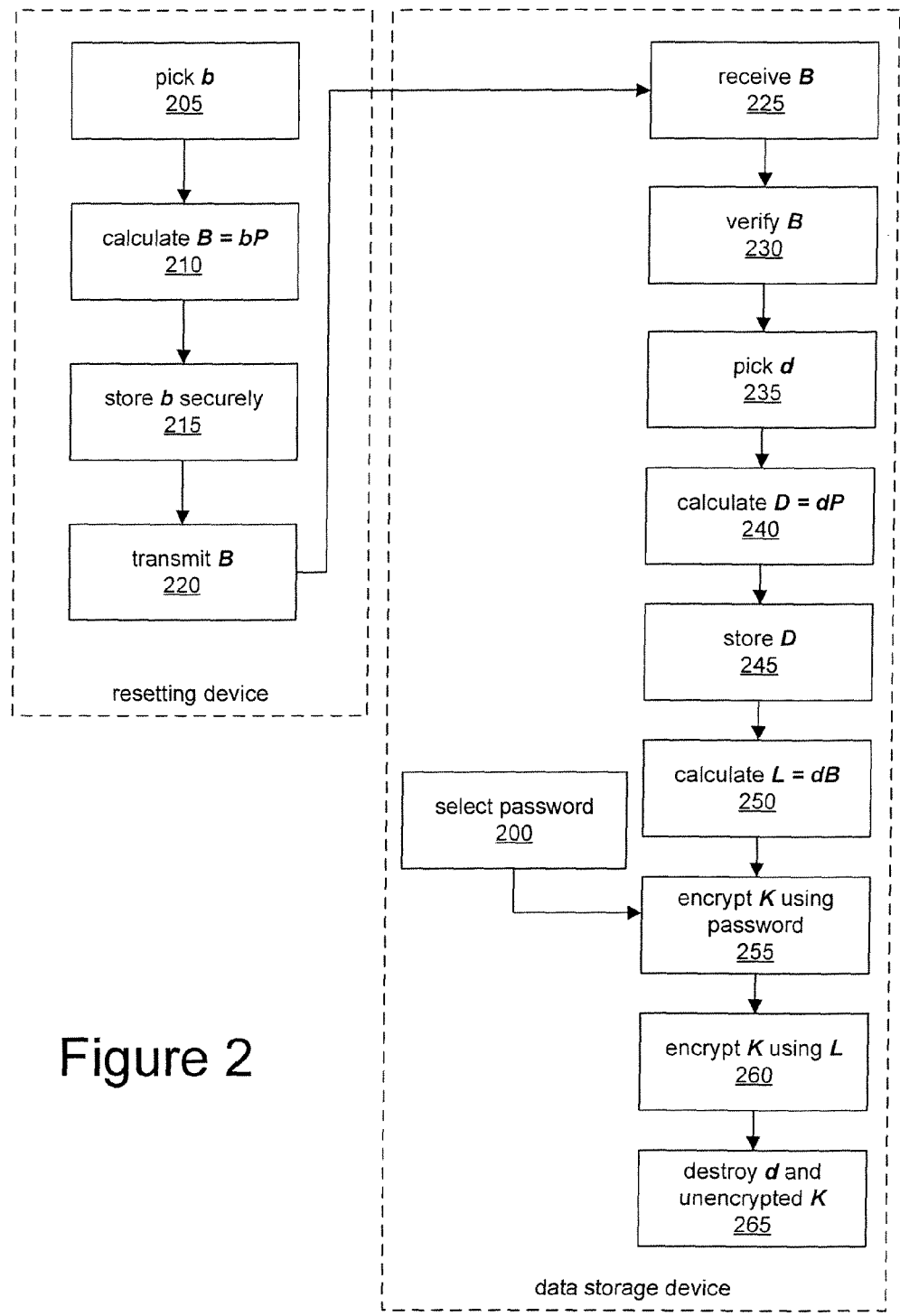
FIG. 2 is a schematic representation of a method for setting a password and an encryption key.

The device 100 or 10 receives B at step 225 and preferably verifies that B is a valid public key at step 230, using techniques known in the art. For example, if an elliptic curve cryptography algorithm is used, then the device 100 or 10 may verify that B is a point on the pre-determined curve defined for this implementation of the algorithm. The device 100 or 10 then selects or generates a key value d at step 235. d is preferably a randomly or pseudo-randomly generated value, again, preferably at least 521 bits long. The device calculates a new public key $D=dP$ at step 240, and stores D at step 245. The device 100 or 10 also calculates a key encryption key $L=dB$ at step 250, where B is the key value received from the server 40. The content protection key K is then encrypted with the key encryption key L at step 260, and this encrypted version of K, enc(K)$_1$, is stored on the device. The content protection key K is also encrypted with the user password, and this second encrypted version of K, enc(K)$_2$, is also stored on the device. This second encryption step is indicated in FIG. 2 at step 255, prior to the encryption of K by L at step 260; however, those skilled in the art will appreciate that these encryption steps may occur in reverse order. (Note that the password itself is provided to or by the device 100 or 10 at step 200, for example by the user or by some other means known in the art; the device itself may be configured to generate a password and provide the password to the user.) Any unencrypted copies of K and d are destroyed by the device at step 265. Thus, the content protection key K is stored in two ciphertext forms on the device, and is preferably not stored anywhere else. The device 100 or 10 and the server 40 may also destroy B.

The steps illustrated in FIG. 2 are shown in the table below:

| Data Storage Device | | Resetting Device |
|---|---|---|
| | | Pick b randomly. |
| | | Calculate B = bP. |
| | | Store b securely. |
| Receive B. | ← B | Send B to data storage device. |
| Pick password. | | |
| Verify B is a valid public key. | | |
| Pick d randomly. | | |
| Calculate D = dP. | | |
| Store D. | | |
| Calculate L = dB. | | |
| Encrypt K with L. | | |
| Encrypt K with password. | | |
| Destroy d. | | |
| Destroy K. | | |

After this procedure, the content protection key K may be recovered in one of two ways. During normal operation, the user may provide the user password in order to log in to or unlock the device, and the device may use the password to decrypt the second encrypted version of K, enc(K)$_2$, stored on the device. In the event that the password is no longer available to decrypt the content protection key K, for example if the user cannot recall the password, a procedure such as that illustrated in FIG. 3 may be followed.

When it is determined that a new password should be set for the device 100 or 10, a user or administrator at the server 40 may select or generate a new password at step 305. The server 40 then requests the public key from the device 100 or 10 at step 310. However, rather than provide the public key D in the clear, upon receipt of the request for the public key at step 415 the device 100 or 10 selects or generates a random or pseudo-random value r and temporarily stores r at step 320, and computes D'=rD at step 325, preferably using elliptic curve cryptography. This blinded public key D' is transmitted to the server 40 at step 430.

After receipt of the blinded public key D' at the server 40 at step 435, the server 40 preferably verifies that D' is a valid public key at step 340, then computes a blinded key L'=bD' at step 345, b having previously stored at the server 40. The server 40 then transmits this newly computed blinded key L' and the new password to the communications device 100 or 10 at step 350. The new password is preferably destroyed at the server 40 at step 390. After the device 100 or 10 receives L' at step 355, it preferably verifies that L' is a valid public key at step 360; the device 100 or 10, computes the inverse function $r^{-1}/L'$=L at step 365. The device can then use L to decrypt the first encrypted version of K, enc(K)$_1$, stored on the device at step 370.

The device 100 or 10 thus derives the original content protection key K, and may use K to decrypt any secure content stored at the device 100 or 10. After decryption, preferably the existing content protection key K is destroyed at step 375, and a new content protection key, K', is generated at step 380 to re-encrypt the content to be secured on the device 100 or 10. This new content protection key K' is preferably protected in a manner similar to that described in relation to FIG. 2; preferably, the server initiates this protection by generating a new private key b as in step 205 in FIG. 2, and then proceeding with the subsequent steps to result in a new key encryption key M; the new password, transmitted at step 350 in FIG. 3, would be used in step 200 in FIG. 2.

Figure 3:
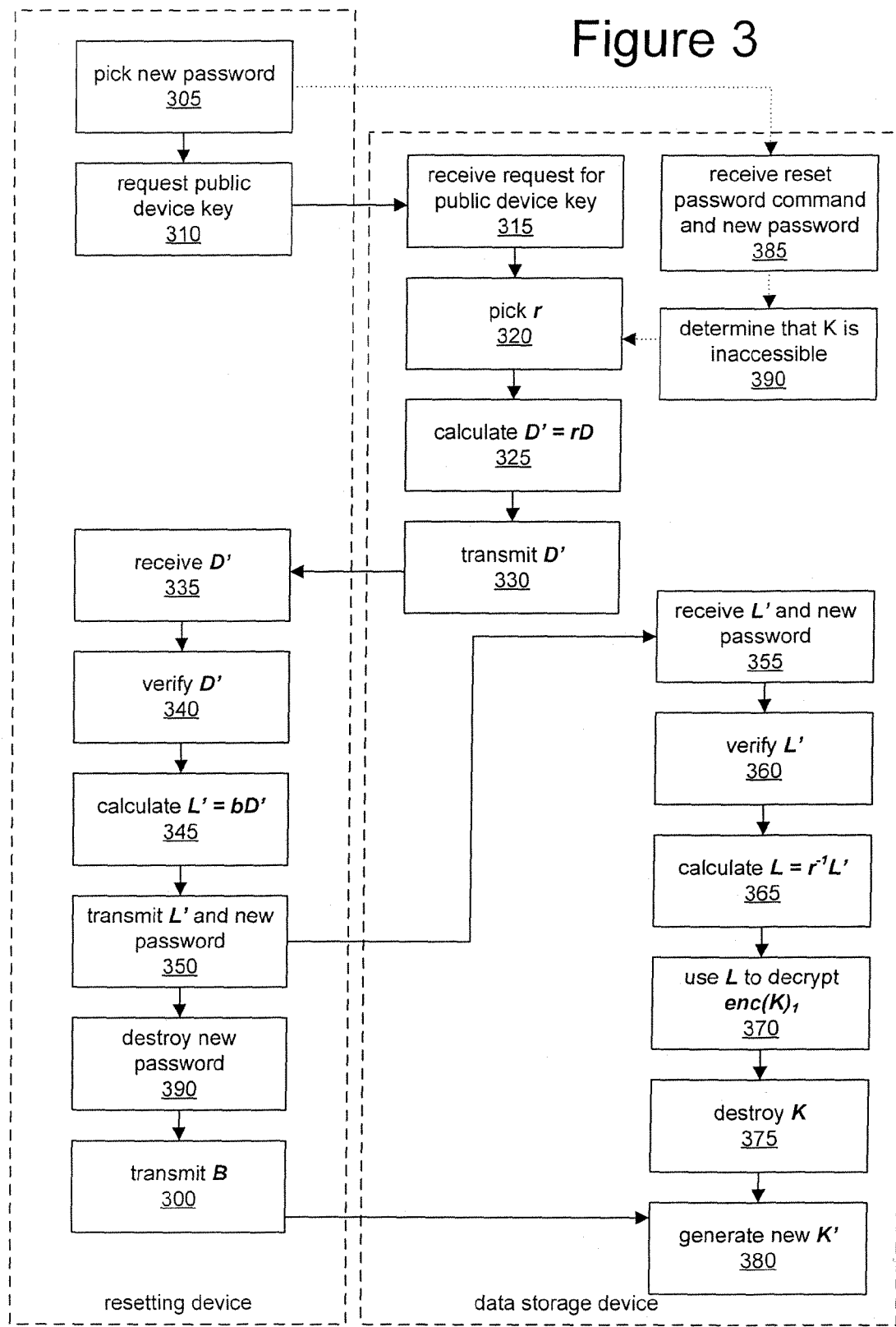
FIG. 3 is a schematic representation of a method for resetting a password and an encryption key.

The steps illustrated in FIG. 3 are shown in the table below:

| Data Storage Device | | Resetting Device |
|---|---|---|
| | | Enter a new password. |
| | ←Request Public Key | Transmit request for device public key. |
| Pick r randomly. | | |
| Keep r in RAM. | | |
| Calculate D' = rD = rdP. | | |
| Send D'. | D' → | Receive D'. |
| | | Verify D' is a valid public key. |
| | | Calculate L' = bD' = brdP = rdB = rL. |
| Receive L', new password. | ← L', new password | Send L' and new password. |
| Verify L' is a valid public key. | | |
| Calculate $r^{-1}$ L' = $r^{-1}$ rL = L. | | |
| Destroy r. | | |
| Use L to decrypt K. | | |
| Destroy K. | | |
| Generate new K'. | | |
| Use new password to encrypt new K'. | | |

If the new content protection key K' is to be protected using a new key encryption key M, the server 40 may generate a new private key b$_1$ and derive a new public key B$_1$ from b$_1$ and a generating point P$_1$, which may be the same generating point P as that used previously. The remaining process to encrypt the new content protection key K' with M is described in the following table:

| Data Storage Device | | Resetting Device |
|---|---|---|
| | | Pick b$_1$ randomly. |
| | | Calculate B$_1$ = b$_1$P$_1$. |
| | | Store b$_1$ securely. |
| Receive B$_1$. | ← B$_1$ | Send B$_1$ to data storage device. |
| Verify B$_1$ is a valid public key. | | |
| Pick d$_1$ randomly. | | |
| Calculate D$_1$ = d$_1$P$_1$. | | |
| Store D$_1$. | | |
| Calculate M = d$_1$B$_1$. | | |
| Encrypt K' with M. | | |
| Encrypt K' with new password. | | |
| Destroy d$_1$. | | |
| Destroy M. | | |

Thus, it will be appreciated that a means has been provided for a content protection key K to be recovered, even if the key K is encrypted by a password that is subsequently lost, by storing an alternate encrypted version of K.

In an alternate embodiment, the resetting device may immediately provide the new password selected at step 305 as part of a reset password command at step 385 without requesting the device's public key, thereby bypassing steps 310 and 315 in FIG. 3. If the device is unable to immediately reset the password to the new value because content protection is enabled and K is stored only in encrypted form as determined at step 390, the device may reply with the blinded public key D', thereby indicating to the server that the key recovery protocol should be initiated. The rest of the protocol may proceed as described as above, with the server optionally providing the new password a second time at step 350.

In a further embodiment, the key encryption key L may be used to encrypt the user password instead of encrypting the content protection K directly. In such an embodiment, both the password encrypted with L and the content protection key K encrypted with the password, or in other words $enc(K)_2$, are stored on the device. If the password is no longer available, the procedure in FIG. 3 may be carried out, except that once the key encryption key L has been recovered at step 365, it may be used to first decrypt the user password, and then the user password may be used to decrypt the encrypted content protection key $enc(K)_2$.

Those skilled in the art will appreciate that the content protection key K is thus secured against a hardware-based attack. While the server 40 stores information useful for the reconstruction of the key encryption key L, a malicious user with access to the server 40 but not the device 100 or 10 will be unable to reconstruct L from the private key b alone. The reconstruction process further shields the protected content from a malicious user at the server 40, since public key D is not transmitted to the server 40; only the key D', which is a blinded version of D, is transmitted to the server 40 such that the server 40 remains unable to compute L. It can be seen that the method of resetting a password that is used to encrypt a content protection key K, as illustrated in FIG. 3, provides a means for retrieving and re-encrypting data stored on the device 100 or 10.

Figure 4:
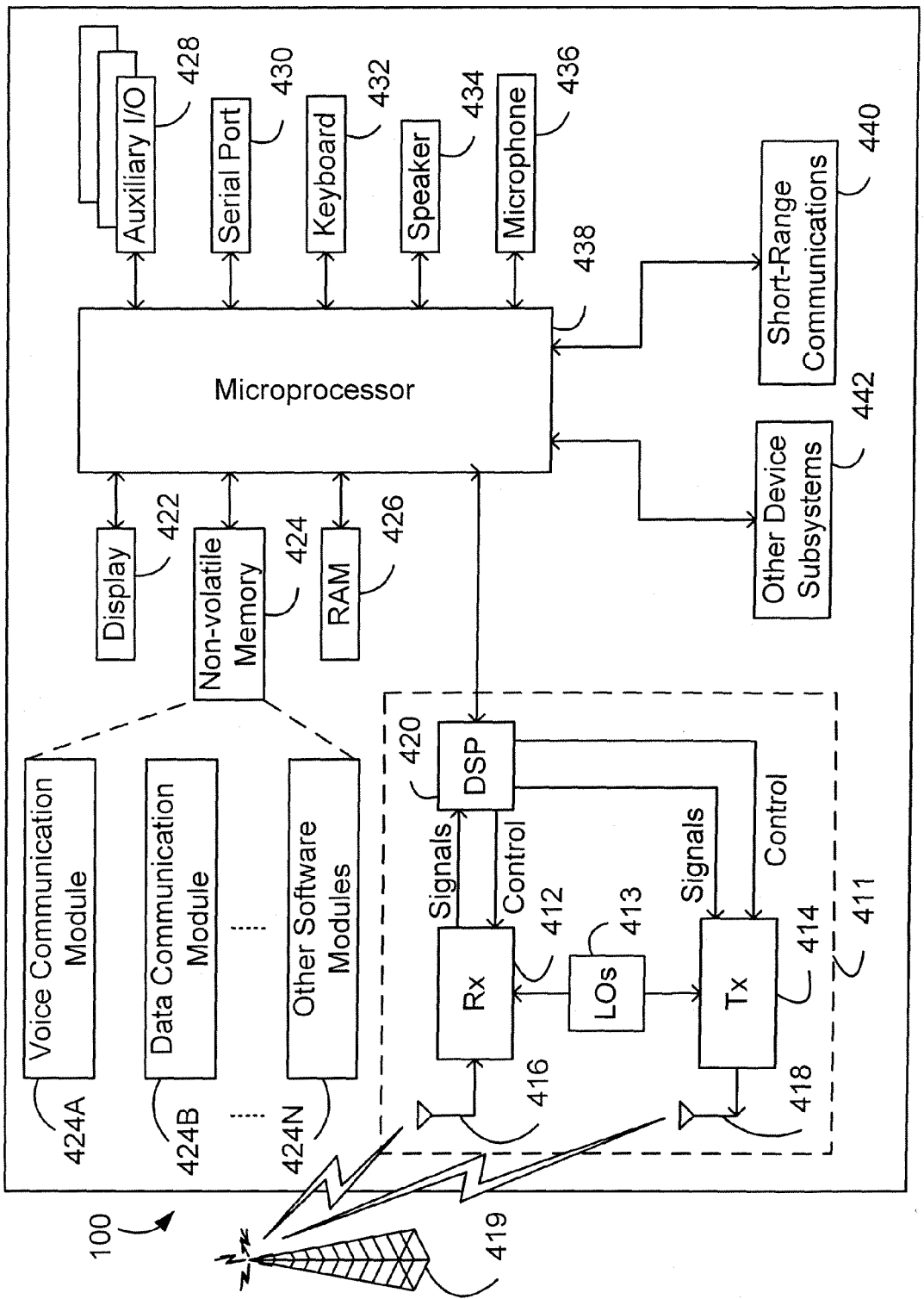
FIG. 4 is a block diagram of a mobile communication device for use with the methods illustrated in FIGS. 2 and 3.

As another example, the systems and methods disclosed herein may be used with many different computers and devices, such as a wireless mobile communications device shown in FIG. 4. With reference to FIG. 4, the mobile device 100 is a dual-mode mobile device and includes a transceiver 411, a microprocessor 438, a display 422, non-volatile memory 424, random access memory (RAM) 426, one or more auxiliary input/output (I/O) devices 428, a serial port 430, a keyboard 432, a speaker 434, a microphone 436, a short-range wireless communications sub-system 440, and other device sub-systems 442.

The transceiver 411 includes a receiver 412, a transmitter 414, antennas 416 and 418, one or more local oscillators 413, and a digital signal processor (DSP) 420. The antennas 416 and 418 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 4 by the communication tower 419. These voice and data networks may be separate communication networks using separate infrastructure, such as base stations, network controllers, etc., or they may be integrated into a single wireless network.

The transceiver 411 is used to communicate with the network 319, and includes the receiver 412, the transmitter 414, the one or more local oscillators 313 and the DSP 320. The DSP 320 is used to send and receive signals to and from the transceivers 416 and 418, and also provides control information to the receiver 412 and the transmitter 414. If the voice and data communications occur at a single frequency, or closely-spaced sets of frequencies, then a single local oscillator 413 may be used in conjunction with the receiver 412 and the transmitter 414. Alternatively, if different frequencies are utilized for voice communications versus data communications for example, then a plurality of local oscillators 413 can be used to generate a plurality of frequencies corresponding to the voice and data networks 419. Information, which includes both voice and data information, is communicated to and from the transceiver 311 via a link between the DSP 420 and the microprocessor 438.

The detailed design of the transceiver 411, such as frequency band, component selection, power level, etc., will be dependent upon the communication network 419 in which the mobile device 100 is intended to operate. For example, a mobile device 100 intended to operate in a North American market may include a transceiver 411 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 419, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 319, other than any legally required operations, such as '911' emergency calling.

After any required network registration or activation procedures have been completed, the mobile device 100 may the send and receive communication signals, including both voice and data signals, over the networks 419. Signals received by the antenna 416 from the communication network 419 are routed to the receiver 412, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 420. In a similar manner, signals to be transmitted to the network 419 are processed, including modulation and encoding, for example, by the DSP 420 and are then provided to the transmitter 414 for digital to analog conversion, frequency up conversion, filtering, amplification and transmission to the communication network 419 via the antenna 418.

In addition to processing the communication signals, the DSP 420 also provides for transceiver control. For example, the gain levels applied to communication signals in the receiver 412 and the transmitter 414 may be adaptively controlled through automatic gain control algorithms implemented in the DSP 420. Other transceiver control algorithms could also be implemented in the DSP 420 in order to provide more sophisticated control of the transceiver 411.

The microprocessor 438 preferably manages and controls the overall operation of the mobile device 100. Many types of microprocessors or microcontrollers could be used here, or, alternatively, a single DSP 420 could be used to carry out the functions of the microprocessor 438. Low-level communication functions, including at least data and voice communications, are performed through the DSP 420 in the transceiver 411. Other, high-level communication applications, such as a voice communication application 424A, and a data communication application 424B may be stored in the non-volatile memory 424 for execution by the microprocessor 438. For example, the voice communication module 424A may provide a high-level user interface operable to transmit and receive voice calls between the mobile device 100 and a plurality of other voice or dual-mode devices via the network 419. Similarly, the data communication module 424B may provide a high-level user interface operable for sending and receiving data, such as e-mail messages, files, organizer information, short text messages, etc., between the mobile device 100 and a plurality of other data devices via the networks 419. The microprocessor 438 also interacts with other device subsystems, such as the display 422, the RAM 426, the auxiliary input/output (I/O) subsystems 428, the serial port 430, the keyboard 432, the speaker 434, the microphone 436, the short-range communications subsystem 440 and any other device subsystems generally designated as 442.

Some of the subsystems shown in FIG. 4 perform communication-related functions, whereas other subsystems may provide "resident" or on-device functions. Notably, some subsystems, such as the keyboard 432 and the display 422 may be used for both communication-related functions, such as entering a text message for transmission over a data communication network, and device-resident functions such as a calculator or task list or other PDA type functions.

Operating system software used by the microprocessor 438 is preferably stored in a persistent store such as non-volatile memory 424. The non-volatile memory 424 may be implemented, for example, as a Flash memory component, or as battery backed-up RAM. In addition to the operating system, which controls low-level functions of the mobile device 410, the non-volatile memory 424 includes a plurality of software modules 424A-424N that can be executed by the microprocessor 438 (and/or the DSP 420), including a voice communication module 424A, a data communication module 424B, and a plurality of other operational modules 424N for carrying out a plurality of other functions. These modules are executed by the microprocessor 438 and provide a high-level interface between a user and the mobile device 100. This interface typically includes a graphical component provided through the display 422, and an input/output component provided through the auxiliary I/O 428, keyboard 432, speaker 434, and microphone 436. The operating system, specific device applications or modules, or parts thereof, may be temporarily loaded into a volatile store, such as RAM 426 for faster operation. Moreover, received communication signals may also be temporarily stored to RAM 426, before permanently writing them to a file system located in a persistent store such as the Flash memory 424.

The non-volatile memory 424 preferably provides a file system to facilitate storage of PIM data items on the device. The PIM application preferably includes the ability to send and receive data items, either by itself, or in conjunction with the voice and data communication modules 424A, 424B, via the wireless networks 419. The PIM data items are preferably seamlessly integrated, synchronized and updated, via the wireless networks 419, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 426. Such information may instead be stored in the non-volatile memory 424, for example, when storage intervals are relatively short, such that the information is removed from memory soon after it is stored. However, storage of this information in the RAM 426 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 430 of the mobile device 100 to the serial port of a computer system or device. The serial port 430 may also be used to enable a user to set preferences through an external device or software application, or to download other application modules 324N for installation. This wired download path may be used to load an encryption key onto the device, which is a more secure method than exchanging encryption information via the wireless network 419. As will be appreciated by those skilled in the art, the methods described in relation to FIGS. 2 and 3 may be carried out with a mobile communication device 100 over either the wired path or a wireless network. Interfaces for other wired download paths may be provided in the mobile device 100, in addition to or instead of the serial port 430. For example, a USB port would provide an interface to a similarly equipped personal computer.

A short-range communications subsystem 440 is also included in the mobile device 100. The subsystem 440 may include an infrared device and associated circuits and components, or a short-range RF communication module such as a Bluetooth® module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems and methods disclosed herein are presented only by way of example and are not meant to limit the scope of the invention. Other variations of the systems and methods described above will be apparent to those skilled in the art and as such are considered to be within the scope of the invention. For example, it should be understood that steps and the order of the steps in the processing described herein may be altered, modified and/or augmented and still achieve the desired outcome. As only one example, the sequence of steps depicted in FIG. 2 and FIG. 3 may be altered with regard to the timing of the destruction of various keys and interim values, provided those keys and values were available for their intended purpose.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

Code adapted to provide the systems and methods described above may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code.

Various embodiments of the present invention having been thus described in detail by way of example, it will be apparent to those skilled in the art that variations and modifications may be made without departing from the invention. The invention includes all such variations and modifications as fall within the scope of the appended claims.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

The invention claimed is:

1. A method for resetting a password at a second device from a first device, the password being used to encrypt a content protection key K to provide a first encrypted content protection key at the second device, the content protection key K also being encrypted by a key encryption key L to provide a second encrypted content protection key at the second device, the key encryption key L being generated from a private key b stored at the first device, an elliptic curve point P, and a private key d, such that $L=dbP$, and wherein a public key $D=dP$ is stored by the second device, and d is not stored at either the first device or the second device, the method comprising the first device:

transmitting a new password to the second device;
receiving a public key D' from the second device, wherein the public key D' is derived from a key value r and the elliptic curve point P;
generating a public key L' from the private key b and the public key D'; and
transmitting to the second device the public key L', wherein transmitting enables the second device to derive the key encryption key L, decrypt the second encrypted content protection key, derive a new content protection key, and encrypt the new content protection key using the new password to provide a new first encrypted content protection key;
generating a public key $B_1$ from a private key $b_1$ and an elliptic curve point $P_1$; and
transmitting to the second device the public key $B_1$, wherein transmitting enables the second device to derive a new key encryption key M from the public key $B_1$, a private key $d_1$, and a public key $D_1$ generated using the private key $d_1$; destroy the private key $d_1$; and encrypt the new password using the new key encryption key M.

2. The method of claim 1, further comprising the second device generating the key value r and the public key D' from the key value r and the public key D.

3. The method of claim 1, further comprising the second device:
decrypting the second encrypted content protection key using the key encryption key L to obtain the content protection key K; and
encrypting the new content protection key using the key encryption key L.

4. The method of claim 3, further comprising the second device, after decrypting the second encrypted content protection key, decrypting content previously encrypted using the content protection key thus decrypted from the second encrypted content protection key and encrypting the content thus decrypted with the new content protection key.

5. The method of claim 1, wherein the first device comprises a server.

6. The method of claim 1, wherein the second device comprises a mobile communication device.

7. A computer program product comprising a non-transitory computer-readable medium bearing code executable by a computing device for carrying out the method of claim 1.

8. A method for resetting a first password at a second device from a first device, the first password being used to encrypt a content protection key K to provide an encrypted content protection key at the second device, the first password also being encrypted by a key encryption key L to provide a first encrypted password stored at the second device, the key encryption key L being generated from a private key b stored at the first device, an elliptic curve point P, and a private key d, such that $L=dbP$, and wherein a public key $D=dP$ is stored by the second device, and d is not stored at either the first device or the second device, the method comprising the first device:

transmitting a second password to the second device;
receiving a public key D' from the second device, wherein the public key D' is derived from a key value r and the elliptic curve point P;
generating a public key L' from the private key b and the public key D';
transmitting the public key L' to the second device,
transmitting the public key L' to the second device, wherein transmitting enables the second device to derive the key encryption key L, decrypt the first encrypted password to obtain the first password, decrypt the encrypted content protection key using the first password thus obtained, derive a new content protection key, and encrypt the new content protection key using the second password to provide a new encrypted content protection key;
generating a public key $B_1$ generated from a private key $b_1$ and an elliptic curve point $P_1$; and
transmitting the public key $B_1$ to the second device, wherein transmitting enables the second device to derive a new key encryption key M from the public key $B_1$, a private key $d_1$, and a public key $D_1$ generated using the private key $d_1$; destroy the private key $d_1$; and encrypt the second password using the new key encryption key M.

9. The method of claim 8, further comprising the second device generating the key value r and the public key D' from the key value r and the public key D.

10. The method of claim 8, further comprising the second device:
- decrypting the first encrypted password using the key encryption key L to obtain the first password;
- decrypting the encrypted content protection key using the first password thus obtained to obtain the content protection key K; and
- encrypting the new content protection key using the second password.

11. The method of claim 10, further comprising the second device, after decrypting the encrypted content protection key to obtain the content protection key K, decrypting content previously encrypted using the content protection key K thus obtained and encrypting the content thus decrypted with the new content protection key.

12. The method of claim 8, wherein the first device comprises a server.

13. The method of claim 8, wherein the second device comprises a mobile communication device.

14. A computer program product comprising a non-transitory computer-readable medium bearing code executable by a computing device for carrying out the method of claim 8.

* * * * *